(12) United States Patent  (10) Patent No.: US 7,175,009 B2
Clark et al.  (45) Date of Patent: Feb. 13, 2007

(54) CAM ACTUATED DRUM BRAKE

(75) Inventors: James R. Clark, Plainwell, MI (US); James H. Sheets, Fort Wayne, IN (US); Dominic Licavoli, Kalamazoo, MI (US); Ralph W. Larson, Olivet, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 10/894,591

(22) Filed: Jul. 20, 2004

(65) Prior Publication Data
US 2006/0016652 A1 Jan. 26, 2006

(51) Int. Cl.
F16D 51/00 (2006.01)

(52) U.S. Cl. .................... 188/329; 188/343; 74/567; 192/93 R

(58) Field of Classification Search ............ 188/329, 188/330, 332, 338, 339, 324, 325, 343; 74/567; 192/78, 93 R
See application file for complete search history.

(56) References Cited

U.S. PATENT DOCUMENTS

| 1,657,852 | A | | 1/1928 | Bendix | |
|---|---|---|---|---|---|
| 1,681,014 | A | | 8/1928 | Sanford | 188/329 |
| 1,726,413 | A | | 8/1929 | Sanford | |
| 1,729,300 | A | | 9/1929 | Terbush | |
| 1,787,494 | A | | 1/1931 | Sanford | 188/329 |
| 2,064,103 | A | | 12/1936 | Burdick | |
| 2,710,076 | A | * | 6/1955 | Russell | 188/330 |
| 3,096,856 | A | * | 7/1963 | Burnett | 188/332 |
| 3,469,660 | A | | 9/1969 | Mathers | 188/78 |
| 4,219,923 | A | * | 9/1980 | Marti | 29/434 |
| 4,260,042 | A | * | 4/1981 | Szalai et al. | 188/330 |
| 4,905,800 | A | | 3/1990 | Mathews | 188/329 |
| 5,062,506 | A | * | 11/1991 | White | 188/329 |
| 5,273,138 | A | | 12/1993 | White | 188/329 |
| 5,310,028 | A | | 5/1994 | Sampson | 188/329 |
| 5,638,928 | A | | 6/1997 | Wemple | |

FOREIGN PATENT DOCUMENTS

EP 0 221 750 A1 5/1987

OTHER PUBLICATIONS

International Search Report issued in corresponding International application PCT/US2005/019573 (Oct. 26, 2005).
Written Opinion issued in corresponding international application PCT/US2005/019573 (Oct. 26, 2005).

* cited by examiner

*Primary Examiner*—Pam Rodriguez
(74) *Attorney, Agent, or Firm*—Dykema Gossett PLLC

(57) ABSTRACT

A cam for a brake is provided that allows for greater brake shoe travel and thicker brake linings while providing the same or greater mechanical force as compared to conventional cams. One or more lobes of the cam include multiple portions having varying profiles in axial cross-section. The variation in the cam profiles results in a cam in which the outermost ends or tips of the lobes are longer than in conventional cams yet retain the same mechanical strength.

118 Claims, 5 Drawing Sheets

CAM ACTUATED DRUM BRAKE

BACKGROUND OF THE INVENTION

1. Field of the Invention

This invention relates to brakes and, in particular, to a cam actuated drum brake that enables the use of brake linings having increased thickness as compared to conventional brakes.

2. Discussion of Related Art

A conventional drum brake includes a brake drum that rotates with a wheel or wheels proximate one end of an axle. The brake drum defines a radially inner braking surface. A brake spider is disposed about the axle and supports an anchor pin that extends axially from the spider. A pair of brake shoes are pivotally mounted on the anchor at a first end. Each brake shoes includes a roller, or cam follower, proximate a second end. A generally S-shaped cam engages the rollers in the brake shoes and rotation of the cam moves the brake shoes between positions of engagement and disengagement with the braking surface of the brake drum.

The brake shoes in a conventional drum brake include brake linings that create a frictional engagement with the braking surface of the brake drum upon actuation of the brake. The brake linings are subject to wear and deterioration. As a result, the linings must be replaced periodically. Replacement of the linings is a significant cost to vehicle fleet operators because of the costs associated with the actual repair and maintenance of the brake and the loss of vehicle operating time.

The inventors herein have recognized a need for a brake and associated brake components that will minimize and/or eliminate one or more of the above-identified deficiencies.

SUMMARY OF THE INVENTION

The present invention provides a brake and several improved brake components. In particular, the present invention provides an improved cam that enables increased travel of brake shoes and thicker brake linings while continuing to provide sufficient actuating force. As a result, the inventive cam and brake reduce maintenance costs and vehicle downtime associated with conventional brakes.

A cam in accordance with the present invention is provided for use in a brake having first and second brake shoes and first and second cam followers in engagement with said cam and with respective ones of said first and second brake shoes in which rotation of the cam in opposite rotational directions about an axis of rotation causes the first and second brake shoes to move between positions of engagement and disengagement with a braking surface. The cam may include a first lobe and a second lobe. At least one lobe of the first and second lobes includes a first portion having a first profile and a second portion having a second profile different from the first profile. In accordance with one aspect of the present invention, the first and second portions may together define a substantially uniform working surface configured for engagement with one cam follower of the first and second cam followers as the first and second brake shoes move from the position of disengagement to the position of engagement and may further define a non-uniform surface opposite the working surface. In accordance with another aspect of the present invention, the first and second portions may together define a working surface configured for engagement with one cam follower of the first and second cam followers as the first and second brake shoes move from the position of disengagement to the position of engagement and a non-uniform surface opposite said working surface with the second portion defining a radially inwardly extending rib that defines a portion of the non-uniform surface. In accordance with another aspect of the present invention, the first and second portions may define a pocket configured to receive one cam follower of the first and second cam follower when the first and second brake shoes are in a position of disengagement with the braking surface. The pocket may extend from a throat of the cam to a tip of the one lobe with the second portion defining a rib extending across at least a portion of the pocket.

A brake in accordance with the present invention may include a brake spider having a central aperture configured to receive an axle extending therethrough and an anchor extending from the brake spider. The brake may further include first and second brake shoes. Each of the first and second brake shoes may include a first web pivotally mounted on the anchor at a first end, a brake table supported on the first web, and a brake lining disposed on the brake table. The brake may further include a first cam follower located at a second end of the first web of the first brake shoe and a second cam follower located at a second end of the first web of the second brake shoe. The brake further includes a cam in engagement with the first and second cam followers, rotation of the cam in opposite rotational directions about an axis of rotation causing the first and second brake shoes to move between positions of engagement and disengagement with a braking surface. The cam includes a first lobe and a second lobe. Each of the first and second lobes includes a first portion having a first profile and a second portion having a second profile different from said first profile. In accordance with one aspect of the present invention, the first and second portions may together define a substantially uniform working surface configured for engagement with one of the first and second cam followers as the first and second brake shoes move from the position of disengagement to the position of engagement and may further define a non-uniform surface opposite the working surface. In accordance with another aspect of the present invention, the first and second portions may together define a working surface configured for engagement with one of the first and second cam followers as the first and second brake shoes move from the position of disengagement to the position of engagement and a non-uniform surface opposite said working surface with the second portion defining a radially inwardly extending rib that defines a portion of the non-uniform surface. In accordance with another aspect of the present invention, the first and second portions may define a pocket configured to receive one cam follower of the first and second cam follower when the first and second brake shoes are in a position of disengagement with the braking surface. The pocket may extend from a throat of the cam to a tip of the one lobe with the second portion defining a rib extending across at least a portion of the pocket.

A brake in accordance with the present invention may alternatively be defined to include a brake drum defining a braking surface and first and second brake shoes pivotally mounted at first ends within the brake drum. The brake may further include a first cam follower in engagement with the first brake shoe proximate a second end of the first brake shoe and a second cam follower in engagement with the second brake shoe proximate a second end of the second brake shoe. The brake may further include a cam in engagement with the first and second cam followers and disposed about an axis of rotation wherein rotation of the cam in opposite rotational direction moves the first and second brake shoes into positions of engagement and disengagement with the braking surface. In accordance with one aspect of the present invention, a difference between a diameter of a circle defined by rotation of the cam about the axis of rotation minus a diameter of a circle defined by rotation of a throat of the cam about the axis of rotation is at least about 21% of a diameter defined by the braking surface of the brake drum. In accordance with another aspect of the present invention, the diameter of a circle defined by rotation of the cam about the axis of rotation is at least about 26.5% of a diameter defined by the braking surface of the brake drum. In accordance with yet another aspect of the present invention, the diameter of the circle defined by rotation of said the about the axis of rotation is at least about five times as large as the diameter of the circle defined by rotation of the throat of the cam about the axis of rotation.

In accordance with another aspect of the present invention, a brake includes an improved positional relationship between the cam and a return spring thereby allowing the use of a larger cam. A brake in accordance with this aspect of the present invention includes a brake drum defining a braking surface. The brake further includes first and second brake shoes. Each of the first and second brake shoes includes first and second webs pivotally mounted at a first end, a brake table supported on the first and second webs, and a brake lining disposed on the brake table. The brake further includes a first cam follower located at second ends of the first and second webs of the first brake shoe and a second cam follower located at second ends of the first and second webs of the second brake shoe. The brake further includes a cam in engagement with the first and second cam followers and disposed about an axis of rotation, rotation of the cam defining a cylinder extending axially beyond the axial ends of the cam. The brake finally includes a return spring coupling the first and second brake shoes and disposed at least partially within the cylinder.

In accordance with yet another aspect of the present invention, an improved brake shoe is provided. A brake shoe in accordance with the present invention includes first and second webs with each of the first and second webs having first and second ends. The brake shoe further includes a brake table supported on the first and second webs and a brake lining disposed on the brake table. The first and second webs are spaced from one another between the first and second ends of the first and second webs and angle towards one another proximate the first ends. The first ends of the first and second webs are configured to receive a cam follower having first and second working surfaces that are disposed outboard of the first and second webs and are configured for engagement with a cam that selectively urges the cam follower outward and the brake lining into engagement with a braking surface.

A cam and brake in accordance with the present invention are advantageous. The improved cam and brake structure enable increased travel of the brake shoes and the use of thicker brake linings. As a result, vehicle maintenance costs and vehicle downtime are significantly reduced.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
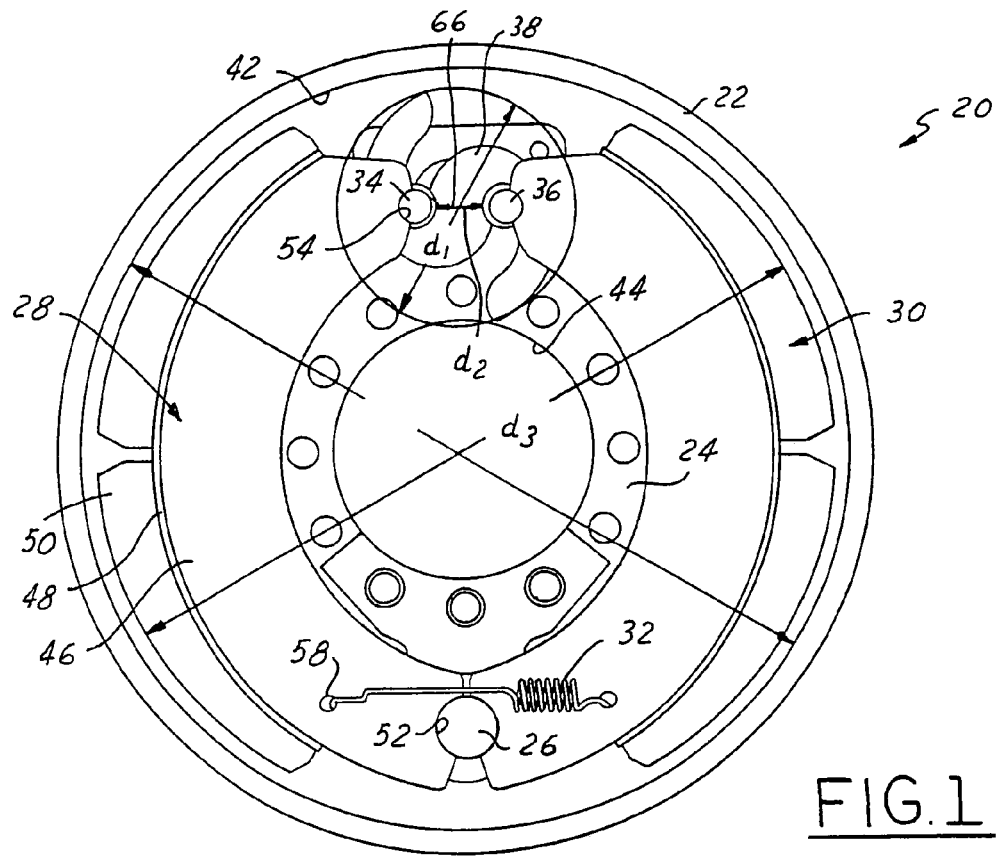
FIG. 1 is a plan view illustrating a brake in accordance with one embodiment of the present invention and illustrating several aspects of a brake in accordance with the present invention.
Figure 2:
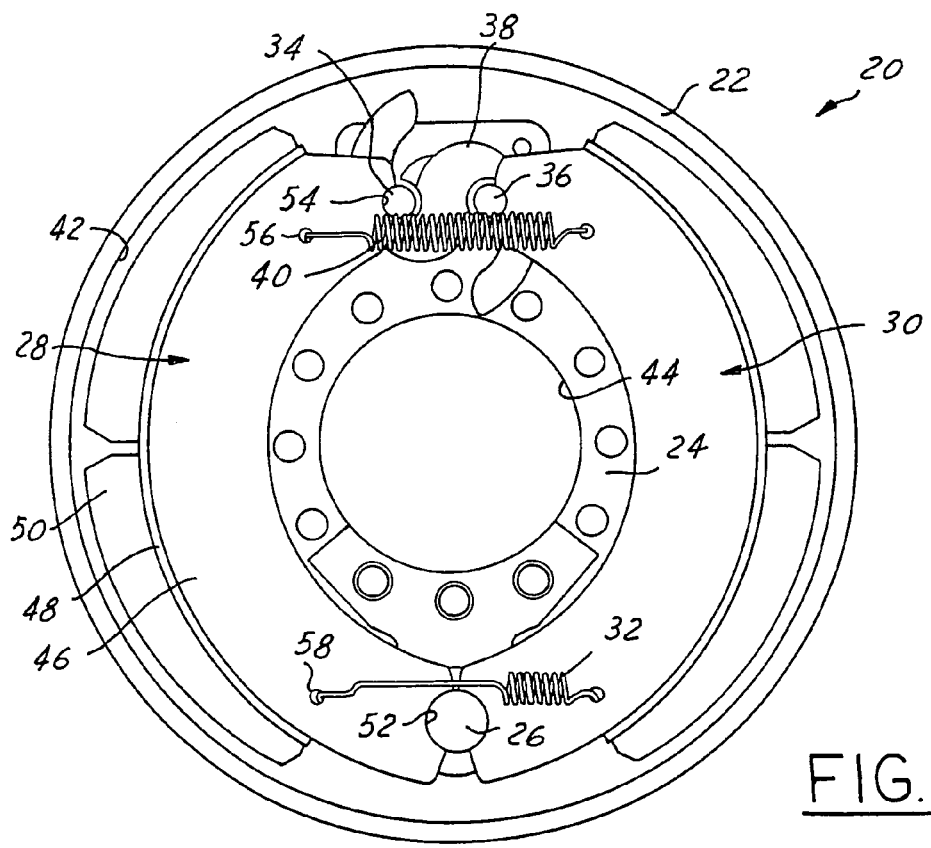
FIG. 2 is a plan view illustrating another aspect of a brake in accordance with the present invention.

Referring now to the drawings wherein like reference numerals are used to identify identical components in the various views, FIGS. 1–2 illustrate a brake 20 in accordance with one embodiment of the present invention. Brake 20 is particularly adapted for use in heavy trucks. It should be understood, however, that brake 20 may be used on a wide variety of vehicles and in non-vehicular applications. Brake 20 may include a brake drum 22, a brake spider 24, an anchor 26, brake shoes 28, 30, retainer springs 32, cam followers 34, 36, a cam 38 in accordance with the present invention, and return springs 40.

Drum 22 provides a braking surface 42 and is conventional in the art. Drum 22 may be made from conventional metals and metal alloys such as steel. Drum 22 is annular and rotates with the vehicle wheel or wheels at one end of an axle.

Brake spider 24 is provided to mount the various components of brake 20 and is also conventional in the art. Spider 24 defines a central aperture 44 through which the vehicle axle may extend. Spider 24 also supports anchor 26 on one side of the axle and may further include an aperture on an opposite side of the axle through which a camshaft (not shown) supporting cam 38 extends.

Anchor 26 is provided to pivotally mount brake shoes 28, 30. Anchor 26 is conventional in the art and is supported on spider 24. Anchor 26 may comprise a round pin that extends axially from spider 24.

Brake shoes 28, 30 are provided for selective engagement with braking surface 42 of drum 22. Brake shoes 28, 30 may each include a pair of spaced webs 46 (only one of which is shown in FIG. 1), a brake table 48, and one or more brake linings 50.

Webs 46 are provide to support brake table 48. Although only one web 46 is visible in the illustrated embodiment, it should be understood that an identical web 46 is axially spaced from the illustrated web and extends generally parallel to the illustrated web. Webs 46 are semicircular in shape and may define semicircular recesses 52, 54 at either end. Recess 52 is configured to receive anchor 26 to enable pivotal motion of web 46 about an axis defined by anchor 26. Recess 54 is configured to receive one of cam followers 34, 36. Webs 46 may also provide means, such as apertures 56, 58 for mounting retainer springs 32 and return springs 40.

Brake table 48 is provided to support brake linings 50 and is conventional in the art. Table 48 may be affixed to webs 46 through welding, adhesives, or other fasteners. Table 48 is semicircular in cross-section and is substantially perpendicular to webs 46.

Linings 50 are provided for frictional engagement with braking surface 42 of drum 22. Linings 50 may be made from conventional friction materials. In accordance with the present invention, linings 50 that are thicker than conventional brake linings may be used to limit maintenance and vehicle down time. In the illustrated embodiment, each brake shoe 28, 30 includes two linings 50 that are about equal in size. It should be understood, however, that the number, size and shape of linings 50 may vary.

Retainer springs 32 are provided to retain brake shoes 28, 30—and particularly webs 46—on anchor 26. Springs are conventional in the art and the ends of springs 32 may be mounted to webs 46 through apertures 56.

Figure 3:
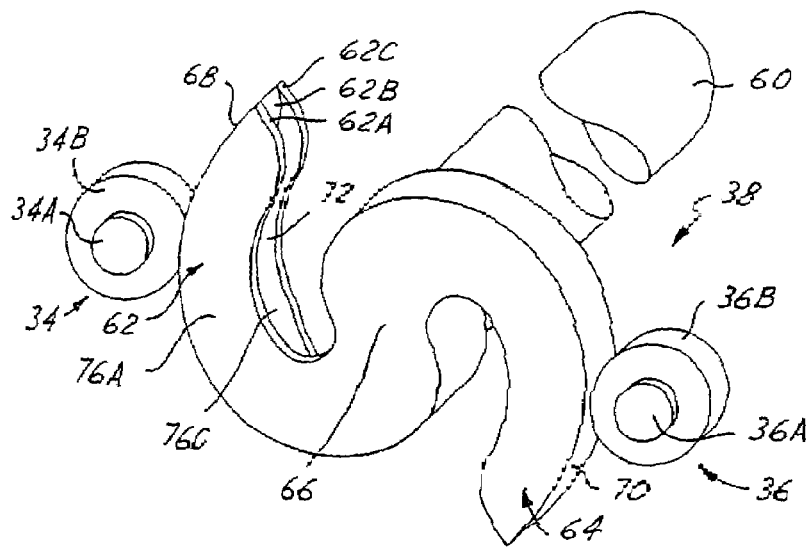
FIGS. 3–4 are perspective and sectional views of a cam in accordance with one embodiment of the present invention in engagement with a pair of cam followers.
Figure 4:
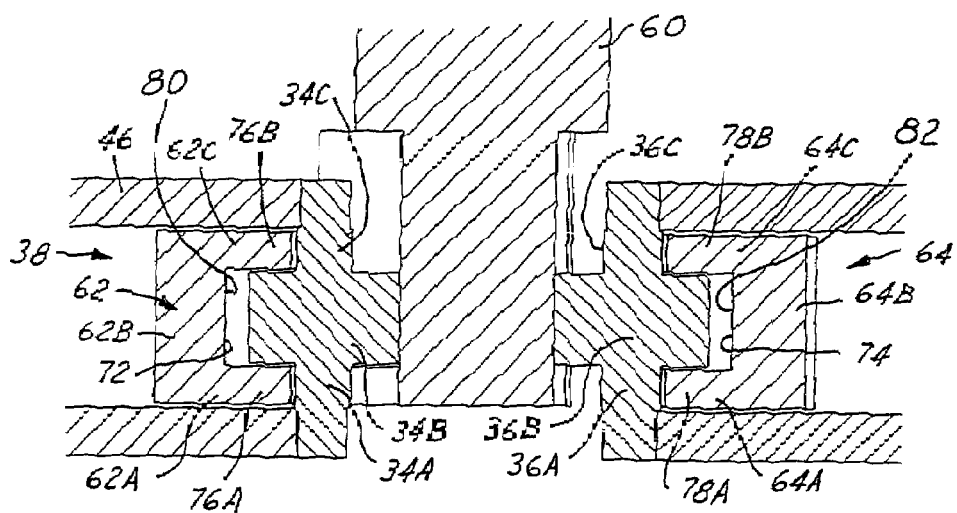

Cam followers 34, 36 provide a working surface for cam 38 to act against in order to move brake shoes 28, 30 between positions of engagement with and disengagement from braking surface 42 of drum 22. Cam followers 34, 36 may be received within recesses 54 in the webs 46 of each brake shoes 28, 30. Cam followers 34, 36 are generally circular in shape. Referring to FIGS. 3–4, cam followers 34, 36 may include a plurality of portions 34A, 34B, 34C and 36A, 36B, 36C, respectively, having varying diameters and defining different profiles is axial cross-section for a purpose described hereinbelow.

Cam 38 is provided to cause movement of brake shoes 28, 30 between positions of engagement with and disengagement from brake shoes 28, 30. Cam 38 is disposed about an axis of rotation that may be generally parallel to the axis of rotation of drum 22 and/or the center axis of the axle. Cam 38 is supported on and may be integral with a camshaft 60 (see FIG. 3) that is driven by pneumatic or other actuation as is know in the art.

Referring now to FIG. 3, one embodiment of a cam 38 in accordance with the present invention is illustrated. In accordance with the present invention, cam 38 includes first and second lobes 62, 64 which may be substantially identical. Lobes 62, 64 have a substantially involute shape and form a generally S-shaped cam. Lobes 62, 64 both extend from a throat 66 of cam 38. The throat 66 of cam 38 is a radial cross-section of cam 38 defined where cam followers 34, 36 are closest together when the brake is disengaged. Each lobe 62, 64 includes multiple portions 62A, 62B, 62C and 64A, 64B, 64C moving axially from one axial end of cam 38 to an opposite axial end of cam 38. Portions 62A, 62C and 64A, 64C are disposed on opposite sides of portions 62B, 64B of lobes 62, 64 and are disposed at axial ends of lobes 62, 64. Each portion 62A, 62B, 62C and each portion 64A, 64B, 64C has a profile in axial cross-section The profile of portions 62A and 62C may be identical and the profiles of portions 64A and 64C may be identical. The profile of portion 62B is different from the profile of portions 62A and 62C while the profile of portion 64B is different from the profile of portions 64A and 64C. Portions 62A, 62B, 62C together define a working surface 68 and portions 64A, 64B, 64C together define a working surface 70 that are configured for engagement with the working surfaces of corresponding cam followers 34, 36 to move brakes shoes 28, 30 between positions of engagement with and disengagement from braking surface 42 of drum 22. The working surfaces 68, 70 may each be substantially uniform in that for any line extending across surface 68 or 70 parallel to the axis of rotation of cam 38, the distance from the axis of rotation (or another axis extending parallel to the axis of rotation) to any point on the line is substantially the same. Portions 62A, 62B and 62C also together define a non-uniform surface 72 opposite working surface 68 while portions 64A, 64B, and 64C together define a non-uniform surface 74 opposite working surface 70. In particular, portions 62A, 62C define a pair of spaced ribs 76A, 76B and portions 64A, 64C together define a pair of spaced ribs 78A, 78B such that portions 62A, 62C and 64A, 64C extend radially inwardly substantially further than corresponding portions 62B, 64B. Ribs 76A, 76B, 78A, 78B may taper such that the radial length of each rib 76A, 76B, 78A, 78B is greatest proximate the tips of each lobe 62, 64 and decreases moving from the tips of lobes 62, 64 to throat 66.

Referring to FIG. 4, when brake shoes 28, 30 are in a fully disengaged position, cam followers 34, 36 are received within pockets 80, 82 formed by lobes 62, 64. Portions 34A, 34B, 34C and 36A, 36B, 36C of cam followers 34, 36 are complementary in shape to the shape of the corresponding non-working surface 72, 74 defined by portions 62A, 62B, 62C and 64A, 64B, 64C of a corresponding lobe 62, 64. Portions 34B, 36B of cam followers 34, 36 are therefore sandwiched between corresponding ribs 76A, 76B and 78A, 78B of portions 62A, 62C and 64A, 64C of lobes 62, 64. Portions 34B, 36B of cam followers 34, 36 are also axially aligned with portions 62A, 62C and 64A, 64C of a corresponding lobe 62, 64 along an axis extending parallel to the axis of rotation of cam 38.

Figure 5:
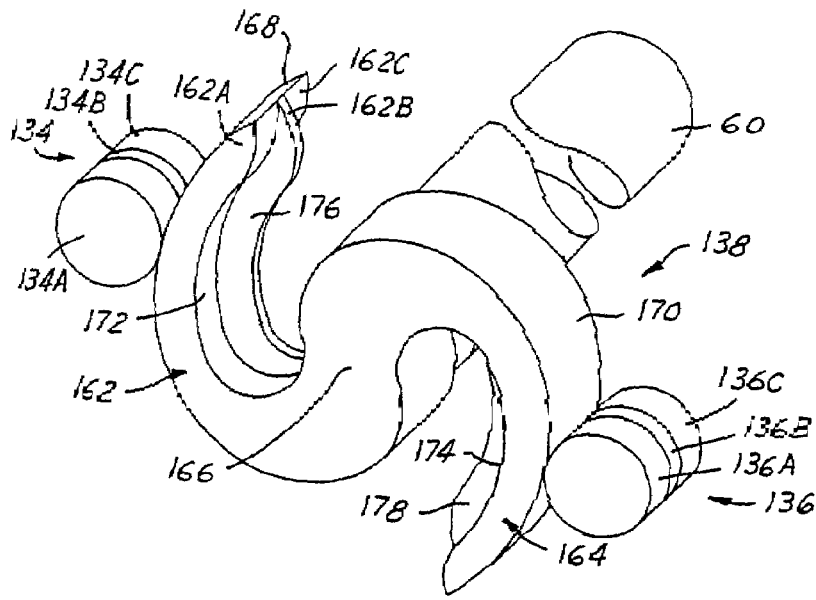
FIGS. 5–6 are perspective and sectional views of a cam in accordance with another embodiment of the present invention in engagement with a pair of cam followers.
Figure 6:
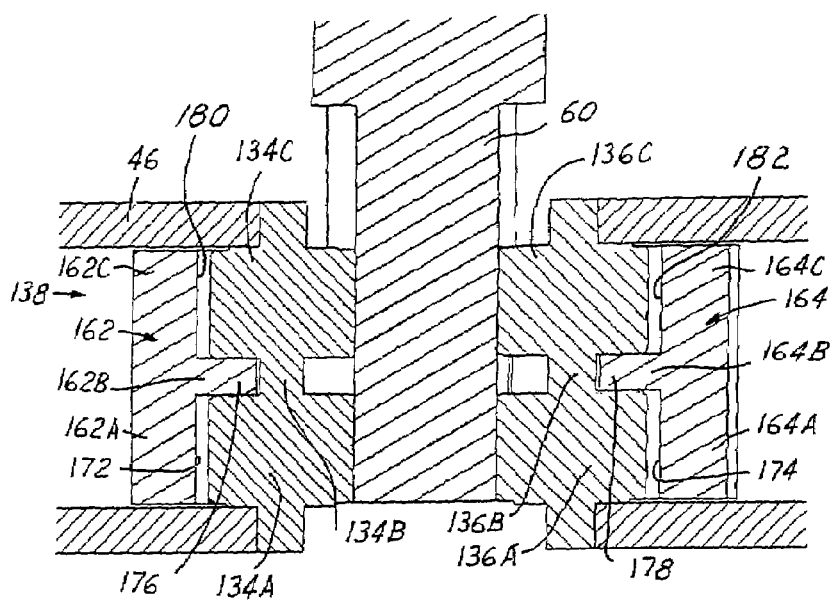

Referring to FIGS. 5–6, a cam 138 in accordance with another embodiment of the present invention will be described. Cam 138 includes first and second lobes 162, 164 which may be substantially identical. Lobes 162, 164 have a substantially involute shape and form a generally S-shaped cam. Lobes 162, 164 both extend from a throat 166 of cam 138. The throat 166 of cam 138 is a radial cross-section of cam 138 defined where cam followers 134, 136 are closest together when the brake is disengaged. Each lobe 162, 164 includes multiple portions 162A, 162B, 162C and 164A, 164B, 164C moving axially from one axial end of cam 138 to an opposite axial end of cam 138. Portions 162B, 164B may be disposed intermediate the axial ends of lobes 162, 164 and may be centered between the axial ends of lobes 162, 164. Each portion 162A, 162B, 162C and each portion 164A, 164B, 164C has a profile in axial cross-section The profile of portions 162A and 162C may be identical and the profiles of portions 164A and 164C may be identical. The profile of portion 162B is different from the profile of portions 162A and 162C while the profile of portion 164B is different from the profile of portions 164A and 164C. Portions 162A, 162B, 162C together define a working surface 168 and portions 164A, 164B, 164C together define a working surface 170 that are configured for engagement with the working surface of a corresponding cam follower 134, 136 to move brakes shoes 28, 30 between positions of engagement with and disengagement from braking surface 42 of drum 22. The working surfaces 168, 170 are each substantially uniform in that for any line extending across surface 168 or 170 parallel to the axis of rotation of cam 138, the distance from the axis of rotation (or another axis extending parallel to the axis of rotation) to any point on the line is substantially the same. Portions 162A, 162B and 162C also together define a non-uniform surface 172 opposite working surface 168 while portions 164A, 164B, and 164C together define a non-uniform surface 174 opposite working surface 170. In particular, portion 162B defines a rib 176 and portion 64B defines a rib 178 such that portions 162B and 164B extend radially inwardly substantially further than corresponding portions 162A, 162C and 164A, 164C. Ribs 176, 178 may taper such that the radial length of each rib 176, 178 is greatest proximate the tips of each lobe 162, 164 and decreases moving from the tips of lobes 162, 164 to throat 166.

Referring to FIG. 6, when brake shoes 28, 30 are in a fully disengaged position, cam followers 134, 136 are received within pockets 180, 182 formed by lobes 162, 164. Portions 134A, 134B, 134C and 136A, 136B, 136C of cam followers 134, 136 are complementary in shape to the shape of the corresponding non-working surface 172, 174 defined by portions 162A, 162B, 162C and 164A, 164B, 164C of a corresponding lobe 162, 164. Portions 134A, 134C and portions 136A, 136C of cam followers 134, 136 are therefore disposed on either side of corresponding ribs 176, 178 of portions 162B, 164B of lobes 162, 164. Portions 134A, 134C and 136A, 136C of cam followers 134, 136 are also axially aligned with portions 162B, 164B of a corresponding lobe 162, 164 along an axis extending parallel to the axis of rotation of cam 138.

Figure 7:
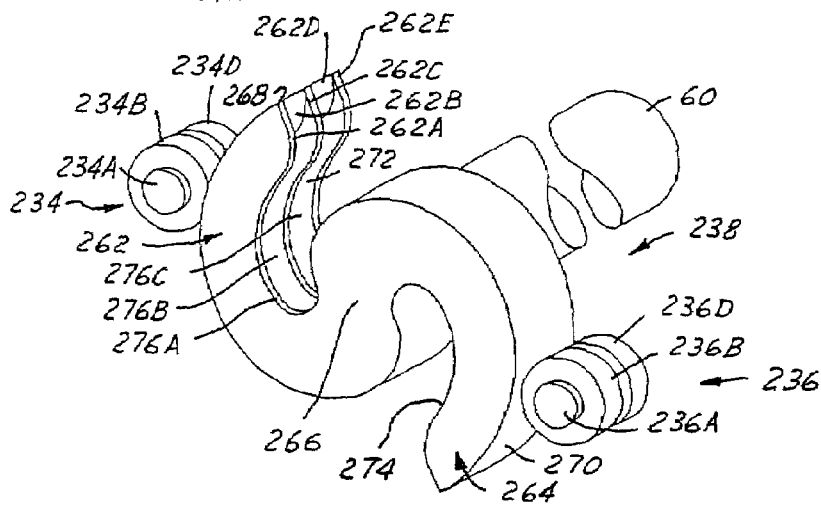
FIGS. 7–8 are perspective and sectional views of a cam in accordance with yet another embodiment of the present invention in engagement with a pair of cam followers.
Figure 8:
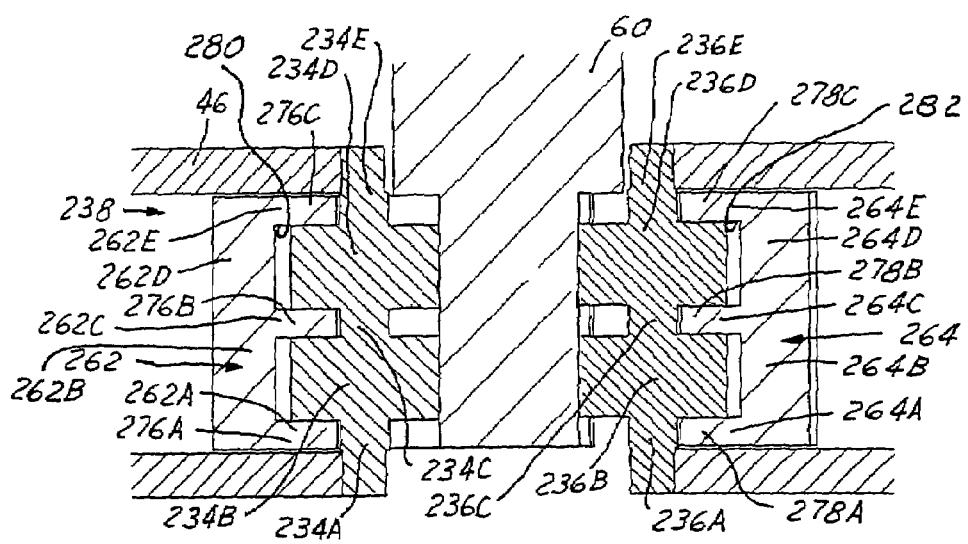
Figure 9:
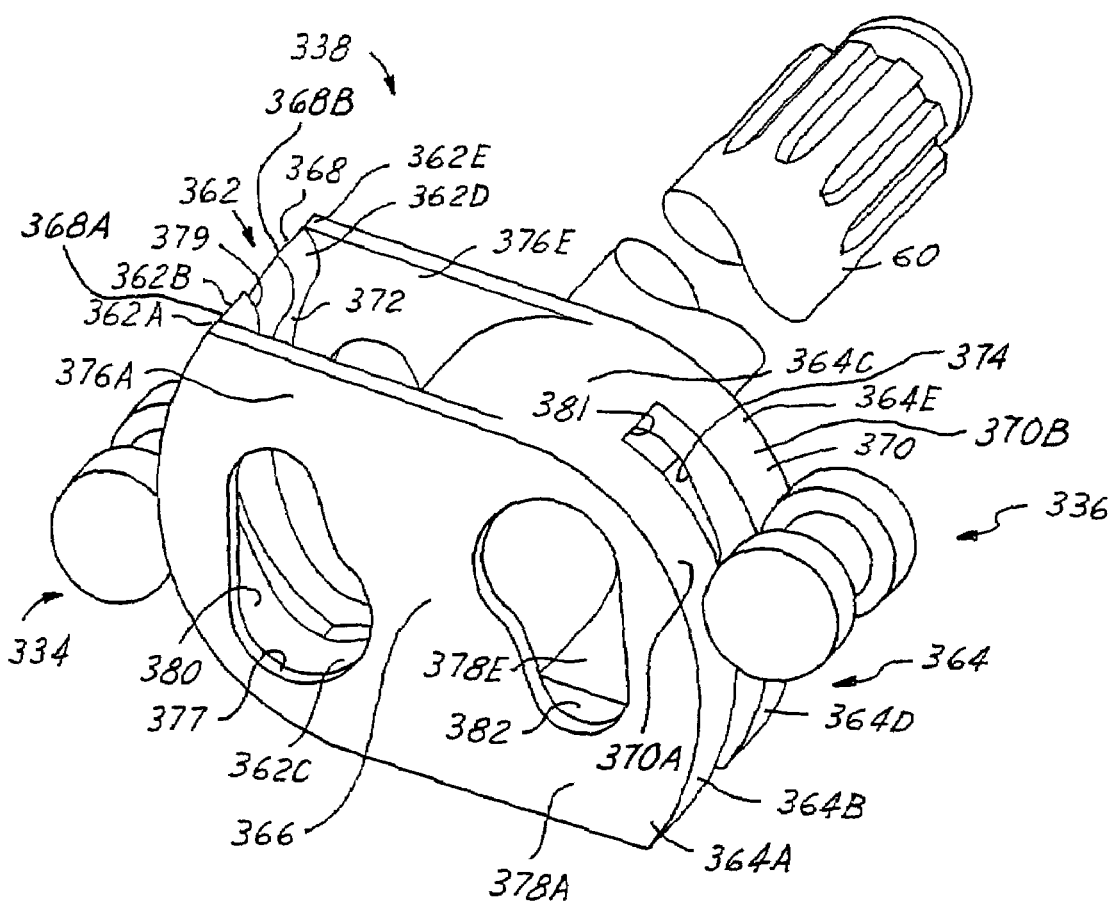
FIGS. 9–10 are perspective and sectional views of a cam in accordance with yet another embodiment of the present invention in engagement with a pair of cam followers.

Referring now to FIGS. 7–8, a cam 238 in accordance with another embodiment of the present invention will be described. Cam 238 includes first and second lobes 262, 264 which may be substantially identical. Lobes 262, 264 have a substantially involute shape and form a generally S-shaped cam. Lobes 262, 264 both extend from a throat 266 of cam 238. The throat 266 of cam 238 is a radial cross-section of cam 238 defined where cam followers 234, 236 are closest together when the brake is disengaged. Each lobe 262, 264 includes multiple portions 262A, 262B, 262C, 262D, 262E and 264A, 264B, 264C, 264D, 264E moving axially from one axial end of cam 238 to an opposite axial end of cam 238. Portions 262C, 264C may be disposed intermediate the axial ends of lobes 262, 264 and may be centered between the axial ends of lobes 262, 264. Portions 262A, 262E and 264A, 264E are disposed on opposite sides of portions 262B, 262C 262D and 264B, 264C, 264D, respectively, of lobes 262, 264 and are disposed at axial ends of lobes 262, 264. Each portion 262A, 262B, 262C, 262D, 262E and each portion 264A, 264B, 264C, 264D, 264E has a profile in axial cross-section The profile of portions 262A, 262C and 262E may be identical and the profiles of portions 264A, 264C and 264E may be identical. The profiles of portions 262B and 262D may be identical and the profiles of portions 264B and 264D may also be identical. The profiles of portion 262B, 262D are different from the profiles of portions 262A, 262C and 262E while the profiles of portions 264B, 264D are different from the profiles of portions 264A, 264C and 264E. Portions 262A, 262B, 262C, 262D, 262E together define a working surface 268 and portions 264A, 264B, 264C, 264D, 264E together define a working surface 270 that are configured for engagement with the working surface of a corresponding cam follower 234, 236 to move brakes shoes 28, 30 between positions of engagement and disengagement from braking surface 42 of drum 22. The working surfaces 268, 270 are each substantially uniform in that for any line extending across surface 268 or 270 parallel to the axis of rotation of cam 238, the distance from the axis of rotation (or another axis extending parallel to the axis of rotation) to any point on the line is substantially the same. Portions 262A, 262B, 262C, 262D and 262E also together define a non-uniform surface 272 opposite working surface 268 while portions 264A, 264B, 264C, 264D and 264E together define a non-uniform surface 274 opposite working surface 270. In particular, portions 262A, 262C and 262E defines spaced ribs 276A, 276B, 276C and portions 264A, 264C, and 264E define spaced ribs 278A, 278B, 278C such that portions 262A, 262C, 262E and 264A, 264C, 264E extend radially inwardly substantially further than corresponding portions 262B, 262D and 264B, 264D. Ribs 276A, 27GB, 276C, 278A, 278B, 278C may taper such that the radial length of each rib 276A, 27GB, 276C, 278A, 278B, 278C is greatest proximate the tips of each lobe 262, 264 and decreases moving from the tips of lobe 262, 264 to throat 266.

Each lobe 362, 364 includes multiple portions 362A, 362B, 362C, 362D, 362E and 364A, 364B, 364C, 364D, 364E moving axially from one axial end of cam 338 to an opposite axial end of cam 338. Portions 362A, 362E and 364A, 364E may be located at opposite axial ends of lobes 362, 364. Portions 362B, 362C, 362D and 364B, 364C, 364D may be disposed intermediate the axial ends of cam 338 with portions 362C and 364C centered between the axial ends of lobes 362, 364. Each portion 362A, 362B, 362C, 362D, 362E and each portion 364A, 364B, 364C, 364D, 364E has a profile in axial cross-section The profile of portions 362A and 362E may be identical and the profiles of portions 364A and 364E may be identical. Further, the profile of portions 362B and 362D may be identical and the profiles of portions 364B and 364D may be identical. The profiles of portion 362A, 362E are different from the profiles of portions 362B, 362C and 362D while the profiles of portions 364A, 364E are different from the profiles of portions 364B, 364C and 364D. Further, the profile of portion 362C is different from the profiles of portions 362A, 362B, 362D and 362E while the profile of portion 364C is different from the profiles of portions 364A, 364B, 364D and 364E.

Portions 362A, 362B, 362C, 362D, 362E together define a working surface 368 including surfaces 368A, 368B and portions 364A, 364B, 364C, 364D, 364E together define a working surface 370 including surfaces 370A, 370B that are configured for engagement with the working surface of a corresponding cam follower 334, 336 to move brakes shoes 328, 330 (shown in FIG. 11) between positions of engagement with and disengagement from braking surface 42 of drum 22. The portions 368A, 368B and 370A, 370B of the working surfaces 368, 370 are substantially uniform in that for any line extending across portions 368A or 368B or surface 368 or portions 370A or 370B of surface 370, parallel to the axis of rotation of cam 338, the distance from the axis of rotation (or another axis extending parallel to the axis of rotation) to any point on the line is substantially the same. Portions 362A, 362B, 362C, 362D and 362E also together define a non-uniform surface 372 opposite working surface 368 while portions 364A, 364B, 364C, 364D and 364E together define a non-uniform surface 374 opposite working surface 370. In particular, portions 362A, 362C, 362E and portions 364A, 364C, 364E are not substantially S-shaped like portions 362B, 326D and 364B, 364D.

Portions 362A, 362E and portions 364A, 364E are similar to integral plates formed or coupled at either axial end of cam 338. Portions 362A, 362E together with portions 362B, 362C, 362D define a pocket 380 configured to receive cam follower 334 when brake shoes 328, 330 are in a position of disengagement with braking surface 42 of drum 22. Similarly, portions 364A, 364E together with portions 364B, 364C, 364D define a pocket 382 configured to receive cam follower 336 when brake shoes 328, 330 are in a position of disengagement with braking surface 42 of drum 22. Pockets 380, 382 extend from throat 366 to the tips of lobes 362, 364 with the tips of lobes 362, 364 comprising the furthest point of travel on lobes 362, 364 from throat 366 for cam followers 334, 336 as cam followers 334, 336 move along working surfaces 368, 370. Portions 362A, 362E and portions 364A, 364E define a pair of ribs 376A, 376E and portions 364A, 364E define a pair of ribs 378A, 378E. Ribs 376A, 376E and 378A, 378E extend across at least a portion of pockets 380, 382, respectively. Portions 362A, 362E and 364A, 364E are disposed outside of either axial end of cam followers 334, 336 when brake shoes 328, 330 are in a position of disengagement with braking surface 42 of drum 22. Portions 362A, 362E and portions 364A, 364E may each define an aperture 377 configured to allow the passage of lubricants to and from cam followers 334, 336 when the brake is disengaged. Apertures 377 are aligned with cam followers 334, 336 along axes extending parallel to the axis of rotation of cam 338 when the brake shoes 328, 330 are in a position of disengagement. Apertures 377 may be generally tear-shaped and may partially follow the contour of surfaces 368, 370. It should be understood, however, that size and shape of apertures 377 and the number of apertures 377 may vary.

Portions 362C and 364C define a shortened tip for lobes 362, 364 relative to portions 362B, 362D and 364B, 364D. As a result, portions 362B, 364B are partially spaced from portion 362D, 364D, respectively, to define slots 379, 381. Slots 379, 381 are configured to receive brake shoes 328, 330 when the brake is disengaged as discussed in greater detail hereinbelow.

Figure 10:
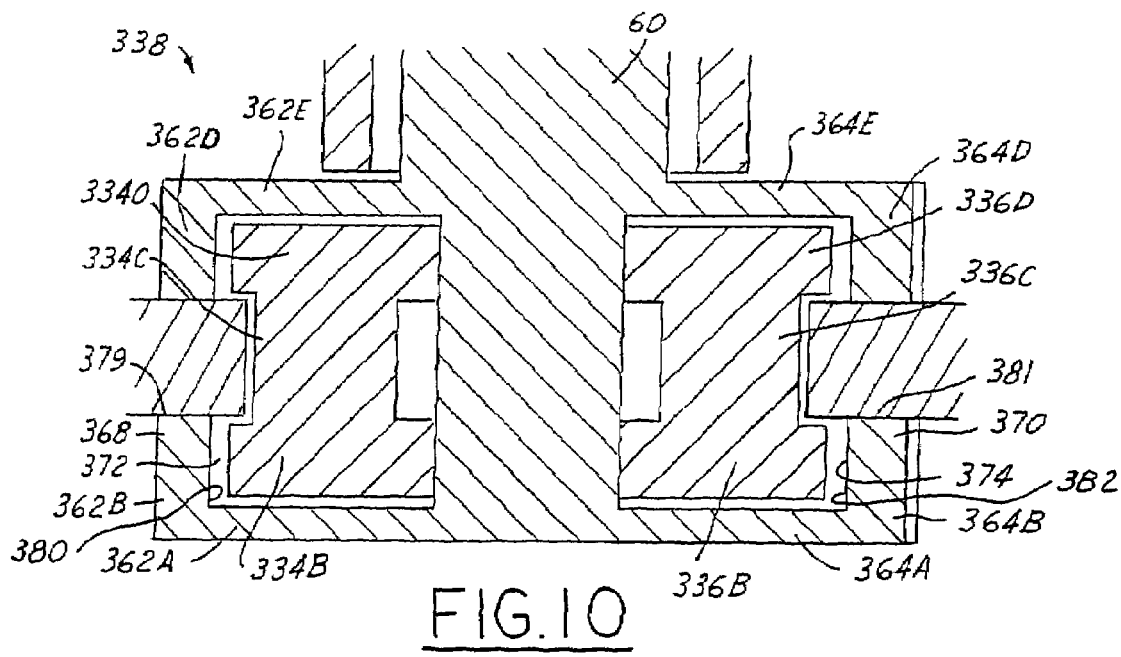

Referring to FIG. 10, when brake shoes 328, 330 are in a fully disengaged position, cam followers 334, 336 are received within pockets 380, 382 formed by lobes 362, 364. Portions 334B, 334C, 334D and 336B, 336C, 336D of cam followers 334, 336 are complementary in shape to the shape of the corresponding non-working surface 372, 374 defined by portions 362B, 362C, 362D and 364B, 364C, 364D of a corresponding lobe 362, 364. Cam followers 334, 336 are sandwiched between corresponding portions 362A, 362E and 364A, 364E of lobes 362, 364. Cam followers 334, 336 are also axially aligned with portions 362A, 362E and 364A, 364E of a corresponding lobe 362, 364 along an axis extending parallel to the axis of rotation of cam 338.

Referring again to FIG. 1, the inventive cams 38, 138, 238, 338 have a larger operating space than conventional cams. The tips of the cam are longer than conventional cams and the structure of the cams 38, 138, 238, 338 enable increased travel of brake shoes 28, 30 and thicker brake linings 32 without the sacrificing mechanical strength of the cam. The novel structure of cams 38, 138, 238, 338 manifests itself in several sized-based relationships that differ from conventional cams. In particular, the diameter $d_1$ of a circle defined by rotation of cam 38 is at least about five times as large as the diameter $d_2$ of a circle defined by rotation the throat 66 of cam 38 about the axis of rotation of cam 38. Further, the difference between the diameter $d_1$ of a circle defined by rotation of cam 38 minus the diameter $d_2$ of a circle defined by rotation the throat 66 of cam 38 about the axis of rotation of cam 38 is at least about 21%, and preferably at least about 25%, of a diameter $d_3$ defined by the braking surface 42 of drum 22. The diameter $d_1$ of the circle defined by rotation of cam 38 is also about 26.5%, and preferably at least about 30%, of a diameter defined by braking surface 42 of brake drum 22.

Referring again to FIG. 2, return springs 40 are provided to bias brake shoes 28, 30 to an position of disengagement from braking surface 42. Springs 40 are conventional in the art. Spring couples extends through apertures 58 of webs 46 of brake shoes 28, 30. Although only one return spring 40 is shown in FIG. 2 joining webs 46 of brake shoes 28, 30, it should be appreciated that a similar spring 40 may couple another set of webs 46 of brake shoes 28, 30 as is known in the art. In accordance with another aspect of the present invention, return springs 42 are positioned differently than in conventional brakes. In particular, return springs 40 are disposed at least partially within cylinder defined by rotation of cam 38 and extending axially beyond the axial ends of cam 38. The positioning of return springs 40 facilitates the use of larger cams 38, 138, 238, 338 without sacrificing the functionality of springs 40.

Figure 11:
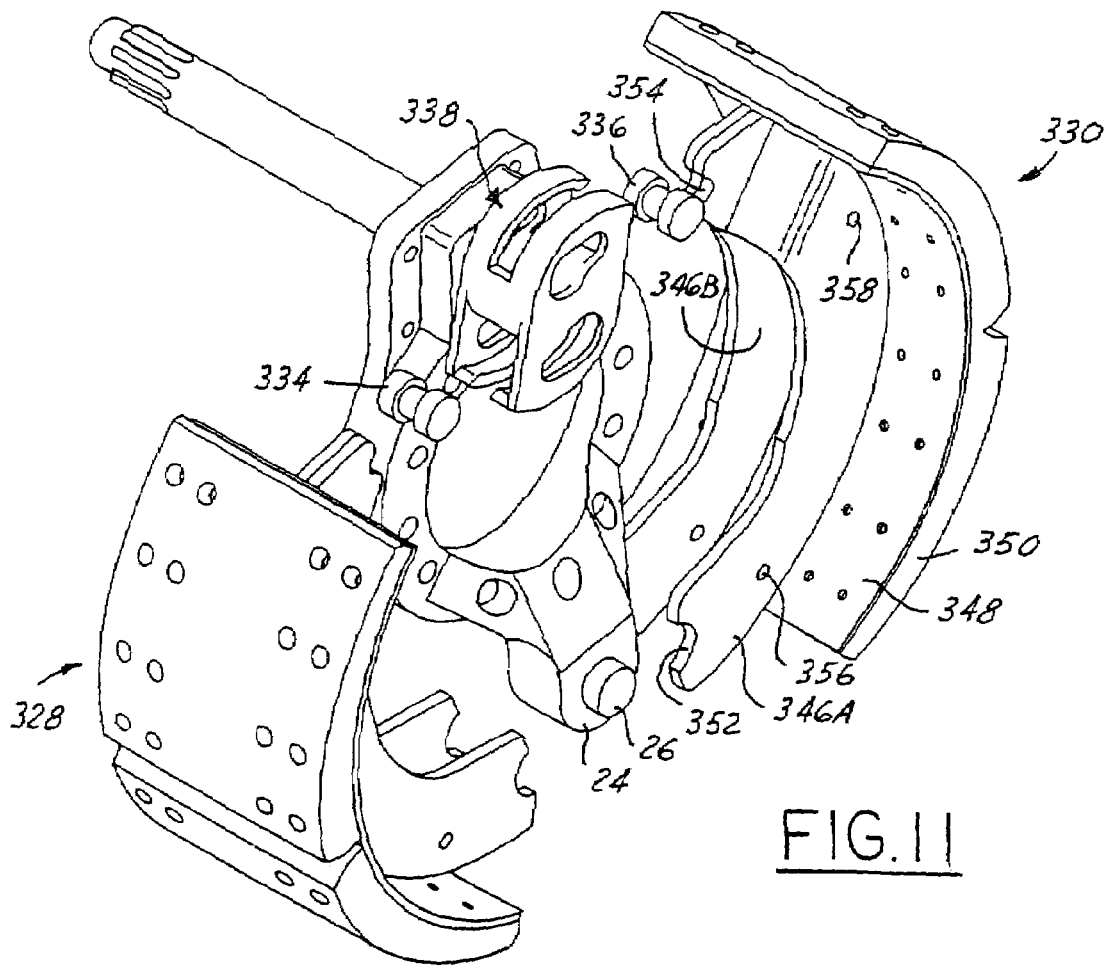
FIG. 11 is an exploded perspective view of a brake in accordance with another embodiment of the present invention.

Referring now to FIG. 11, in accordance with yet another aspect of the present invention, improved brake shoes 328, 330 are provided. Brake shoes 328, 330 includes webs 346A, 346B, a brake table 348 and one or more brake linings 350. Brake table 348 and linings 350 may be substantially the same as table 48 and linings 50 and, therefore, a description of these components may be found hereinabove.

Webs 346A, 346B are provided to support brake table 348. Webs 346A, 346B are semicircular in shape and may define semicircular recesses 352, 354 at either end. Recess 352 is configured to receive anchor 26 to enable pivotal motion of a web 346A, 346B about an axis defined by anchor 26. Recess 354 is configured to receive one of cam followers 334, 336. Webs 346A, 346B may also provide means, such as apertures 356, 358 for mounting retainer springs 32 and return springs 40. Webs 346A, 346B are spaced from one another between the arcuate, longitudinal ends of webs 346A, 346B. Proximate one end of webs 346A, 346B—the end configured to receive one of cam followers 334, 336—webs 346A, 346B angle towards one another. Webs 346A, 346B may further engage one another proximate this end as shown in the illustrated embodiment. A cam follower 334, 336 is thereby received in recess 354 such that the working surfaces 334B, 334D or 336B, 336D of the cam follower 34 or 36 are disposed outboard of webs 346A, 346B.

A brake in accordance with the present invention has significant advantages as compared to conventional brakes. The inventive cam enables increased travel of the brake shoes in the brake and the use of thicker brake linings. As a result, maintenance costs and vehicle downtime are significantly reduced.

While the invention has been shown and described with reference to one or more particular embodiments thereof, it will be understood by those of skill in the art that various changes and modifications can be made without departing from the spirit and scope of the invention.

We claim:

1. A cam for use in a brake having first and second brake shoes and first and second cam followers in engagement with said cam and with respective ones of said first and second brake shoes in which rotation of said cam in opposite rotational directions about an axis of rotation causes said first and second brake shoes to move between positions of engagement and disengagement with a braking surface, said cam comprising:

a first lobe; and, a second lobe wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface wherein said second portion of said one lobe defines an aperture extending axially therethrough, said aperture axially aligned with said one cam follower along an axis extending parallel to said axis of rotation when said first and second brake shoes are in said position of disengagement.

2. The cam of claim 1 wherein said second portion of said one lobe is disposed outboard of a first axial end of said one cam follower.

3. The cam of claim 1 wherein said first and second profiles comprise profiles in axial cross-section.

4. The cam of claim 1 wherein said first portion is located at a first point along said axis and said second portion is located at a second point along said axis different from said first point.

5. The cam of claim 1 wherein said first portion is located at a first point along said axis and extends from a throat of said cam to a tip of said at least one lobe and said second portion is located at a second point along said axis different from said first point and extends from said throat to said tip.

6. A cam for use in a brake having first and second brake shoes and first and second cam followers in engagement with said cam and with respective ones of said first and second brake shoes in which rotation of said cam in opposite rotational directions about an axis of rotation causes said first and second brake shoes to move between positions of engagement and disengagement with a braking surface, said cam comprising:
 a first lobe; and,
 a second lobe
 wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface
 wherein said one lobe includes a third portion having a third profile substantially similar to said first profile of said first portion of said one lobe and a fourth portion having a fourth profile substantially similar to said second profile of said second portion of said one lobe, said first portion of said one lobe spaced from said third portion of said one lobe to define a slot.

7. The cam of claim 6 wherein said slot is configured to receive a portion of one of said first and second brake shoes.

8. The cam of claim 6 wherein said first and second profiles comprise profiles in axial cross-section.

9. The cam of claim 6 wherein said first portion is located at a first point along said axis and said second portion is located at a second point along said axis different from said first point.

10. The cam of claim 6 wherein said first portion is located at a first point along said axis and extends from a throat of said cam to a tip of said at least one lobe and said second portion is located at a second point along said axis different from said first point and extends from said throat to said tip.

11. A brake, comprising:
 a brake spider having a central aperture configured to receive an axle extending therethrough;
 an anchor extending from said brake spider;
 first and second brake shoes, each of said brake shoes including:
  a first web pivotally mounted on said anchor at a first end;
  a brake table supported on said first web; and,
  a brake lining disposed on said brake table; and,
 a first cam follower located at a second end of said first web of said first brake shoe;
 a second cam follower located at a second end of said first web of said second brake shoe; and,
 a cam in engagement with said first and second cam followers, rotation of said cam in opposite rotational directions about an axis of rotation causing said first and second brake shoes to move between positions of engagement and disengagement with a braking surface, said cam comprising:
  a first lobe; and,
  a second lobe
 wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface
 wherein said second portion of said one lobe defines an aperture extending axially therethrough, said aperture axially aligned with said one cam follower along an axis extending parallel to said axis of rotation when said first and second brake shoes are in said position of disengagement.

12. The brake of claim 11 wherein said second portion of said one lobe is disposed outboard of a first axial end of said one cam follower.

13. The brake of claim 11 wherein said first and second profiles comprise profiles in axial cross-section.

14. The brake of claim 11 wherein said first portion is located at a first point along said axis and said second portion is located at a second point along said axis different from said first point.

15. The brake of claim 11 wherein said first portion is located at a first point along said axis and extends from a throat of said cam to a tip of said at least one lobe and said second portion is located at a second point along said axis different from said first point and extends from said throat to said tip.

16. A brake, comprising:
 a brake spider having a central aperture configured to receive an axle extending therethrough;
 an anchor extending from said brake spider;
 first and second brake shoes, each of said brake shoes including:
  a first web pivotally mounted on said anchor at a first end;
  a brake table supported on said first web; and,
  a brake lining disposed on said brake table; and,
 a first cam follower located at a second end of said first web of said first brake shoe;
 a second cam follower located at a second end of said first web of said second brake shoe; and,
 a cam in engagement with said first and second cam followers, rotation of said cam in opposite rotational directions about an axis of rotation causing said first and second brake shoes to move between positions of engagement and disengagement with a braking surface, said cam comprising:
  a first lobe; and,
  a second lobe wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface wherein said one lobe includes a third portion having a third profile substantially similar to said first profile of said first portion of said one lobe and a fourth portion having a fourth profile substantially similar to said second profile of said second portion of said one lobe, said first portion of said one lobe spaced from said third portion of said one lobe to define a slot.

17. The brake of claim 16 wherein said slot is configured to receive a portion of a corresponding one of said first and second brake shoes.

18. The brake of claim 16 wherein said first and second profiles comprise profiles in axial cross-section.

19. The brake of claim 16 wherein said first portion is located at a first point along said axis and said second portion is located at a second point along said axis different from said first point.

20. The brake of claim 16 wherein said first portion is located at a first point along said axis and extends from a throat of said cam to a tip of said at least one lobe and said second portion is located at a second point along said axis different from said first point and extends from said throat to said tip.

21. A cam for use in a brake having first and second brake shoes and first and second cam followers in engagement with said cam and with respective ones of said first and second brake shoes in which rotation of said cam in opposite rotational directions about an axis of rotation causes said first and second brake shoes to move between positions of engagement and disengagement with a braking surface, said cam comprising:

a first lobe; and, a second lobe wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket wherein said second portion of said one lobe defines an aperture extending axially therethrough, said aperture axially aligned with said one cam follower along an axis extending parallel to said axis of rotation when said first and second brake shoes are in said position of disengagement.

22. The cam of claim 21 wherein said second portion of said one lobe is disposed outboard of a first axial end of said one cam follower.

23. The cam of claim 21 wherein said first and second profiles comprise profiles in axial cross-section.

24. The cam of claim 21 wherein said first portion is located at a first point along said axis and said second portion is located at a second point along said axis different from said first point.

25. The cam of claim 21 wherein said first portion is located at a first point along said axis and extends from a throat of said cam to a tip of said at least one lobe and said second portion is located at a second point along said axis different from said first point and extends from said throat to said tip.

26. A cam for use in a brake having first and second brake shoes and first and second cam followers in engagement with said cam and with respective ones of said first and second brake shoes in which rotation of said cam in opposite rotational directions about an axis of rotation causes said first and second brake shoes to move between positions of engagement and disengagement with a braking surface, said cam comprising:

a first lobe; and, a second lobe wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket wherein said one lobe includes a third portion having a third profile substantially similar to said first profile of said first portion of said one lobe and a fourth portion having a fourth profile substantially similar to said second profile of said second portion of said one lobe, said first portion of said one lobe spaced from said third portion of said one lobe to define a slot.

27. The cam of claim 26 wherein said slot is configured to receive a portion of one of said first and second brake shoes.

28. The cam of claim 26 wherein said first and second profiles comprise profiles in axial cross-section.

29. The cam of claim 26 wherein said first portion is located at a first point along said axis and said second portion is located at a second point along said axis different from said first point.

30. The cam of claim 26 wherein said first portion is located at a first point along said axis and extends from a throat of said cam to a tip of said at least one lobe and said second portion is located at a second point along said axis different from said first point and extends from said throat to said tip.

31. A brake, comprising:

a brake spider having a central aperture configured to receive an axle extending therethrough;

an anchor extending from said brake spider;

first and second brake shoes, each of said brake shoes including:

a first web pivotally mounted on said anchor at a first end;

a brake table supported on said first web; and, a brake lining disposed on said brake table; and, a first cam follower located at a second end of said first web of said first brake shoe;

a second cam follower located at a second end of said first web of said second brake shoe; and, a cam in engagement with said first and second cam followers, rotation of said cam in opposite rotational directions about an axis of rotation causing said first and second brake shoes to move between positions of engagement and disengagement with a braking surface, said cam comprising:
a first lobe; and,
a second lobe
wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket
wherein said second portion of said one lobe defines an aperture extending axially therethrough, said aperture axially aligned with said one cam follower along an axis extending parallel to said axis of rotation when said first and second brake shoes are in said position of disengagement.

32. The brake of claim 31 wherein said second portion of said one lobe is disposed outboard of a first axial end of said one cam follower.

33. The brake of claim 31 wherein said first and second profiles comprise profiles in axial cross-section.

34. The brake of claim 31 wherein said first portion is located at a first point along said axis and said second portion is located at a second point along said axis different from said first point.

35. The brake of claim 31 wherein said first portion is located at a first point along said axis and extends from a throat of said cam to a tip of said at least one lobe and said second portion is located at a second point along said axis different from said first point and extends from said throat to said tip.

36. A brake, comprising:
a brake spider having a central aperture configured to receive an axle extending therethrough;
an anchor extending from said brake spider;
first and second brake shoes, each of said brake shoes including:
a first web pivotally mounted on said anchor at a first end;
a brake table supported on said first web; and,
a brake lining disposed on said brake table; and,
a first cam follower located at a second end of said first web of said first brake shoe;
a second cam follower located at a second end of said first web of said second brake shoe; and,
a cam in engagement with said first and second cam followers, rotation of said cam in opposite rotational directions about an axis of rotation causing said first and second brake shoes to move between positions of engagement and disengagement with a braking surface, said cam comprising:
a first lobe; and,
a second lobe
wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket
wherein said one lobe includes a third portion having a third profile substantially similar to said first profile of said first portion of said one lobe and a fourth portion having a fourth profile substantially similar to said second profile of said second portion of said one lobe, said first portion of said one lobe spaced from said third portion of said one lobe to define a slot.

37. The brake of claim 36 wherein said slot is configured to receive a portion of one of said first and second brake shoes.

38. The brake of claim 36 wherein said first and second profiles comprise profiles in axial cross-section.

39. The brake of claim 36 wherein said first portion is located at a first point along said axis and said second portion is located at a second point along said axis different from said first point.

40. The brake of claim 36 wherein said first portion is located at a first point along said axis and extends from a throat of said cam to a tip of said at least one lobe and said second portion is located at a second point along said axis different from said first point and extends from said throat to said tip.

41. A brake, comprising:
a brake drum defining a braking surface;
first and second brake shoes pivotally mounted at first ends within said brake drum;
a first cam follower in engagement with said first brake shoe proximate a second end of said first brake shoe;
a second cam follower in engagement with said second brake shoe proximate a second end of said second brake shoe.
a cam in engagement with said first and second cam followers and disposed about an axis of rotation
wherein rotation of said cam in opposite rotational direction moves said first and second brake shoes into positions of engagement and disengagement with said braking surface and a difference between a diameter of a circle defined by rotation of said cam about said axis of rotation minus a diameter of a circle defined by rotation of a throat of said cam about said axis of rotation is at least about 21% of a diameter defined by said braking surface of said brake drum.

42. The brake of claim 41 wherein said difference is at least about 25% of said diameter defined by said braking surface of said brake drum.

43. The brake of claim 41 wherein said cam includes
a first lobe; and,
a second lobe
wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface.

44. The brake of claim 41 wherein said cam includes
a first lobe; and,
a second lobe wherein at least one lobe of said first and second lobes includes a first portion having a first profile and a second portion having a second profile different from said first profile, said first and second portions together defining a working surface configured for engagement with one cam follower of said first and second cam followers as said first and second brake shoes move from said position of disengagement to said position of engagement and a non-uniform surface opposite said working surface, said second portion defining a first radially inwardly extending rib defining a portion of said non-uniform surface.

45. The brake of claim 41 wherein said cam includes:
a first lobe; and,
a second lobe
wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from said throat of said cam to a tip of said one lobe, said second portion defining a rib extending across at least a portion of said pocket.

46. The brake of claim 41 wherein said difference is at least about 24% of said diameter defined by said braking surface of said drum.

47. A brake, comprising:
a brake drum defining a braking surface;
first and second brake shoes pivotally mounted at first ends within said brake drum;
a first cam follower in engagement with said first brake shoe proximate a second end of said first brake shoe;
a second cam follower in engagement with said second brake shoe proximate a second end of said second brake shoe;
a cam in engagement with said first and second cam followers and disposed about an axis of rotation
wherein rotation of said cam in opposite rotational direction moves said first and second brake shoes into positions of engagement and disengagement with said braking surface and a diameter of a circle defined by rotation of said cam about said axis of rotation is at least about 30% of a diameter defined by said braking surface of said brake drum.

48. The brake of claim 47 wherein said cam includes
a first lobe; and,
a second lobe
wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface.

49. The brake of claim 47 wherein said cam includes
a first lobe; and,
a second lobe
wherein at least one lobe of said first and second lobes includes a first portion having a first profile and a second portion having a second profile different from said first profile, said first and second portions together defining a working surface configured for engagement with one cam follower of said first and second cam followers as said first and second brake shoes move from said position of disengagement to said position of engagement and a non-uniform surface opposite said working surface, said second portion defining a first radially inwardly extending rib defining a portion of said non-uniform surface.

50. The brake of claim 47 wherein said cam includes:
a first lobe; and,
a second lobe
wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket.

51. A brake, comprising:
a brake drum defining a braking surface;
first and second brake shoes pivotally mounted at first ends within said brake drum;
a first cam follower in engagement with said first brake shoe proximate a second end of said first brake shoe;
a second cam follower in engagement with said second brake shoe proximate a second end of said second brake shoe;
a cam in engagement with said first and second cam followers and disposed about an axis of rotation
wherein rotation of said cam in opposite rotational direction moves said first and second brake shoes into positions of engagement and disengagement with said braking surface and a diameter of a circle defined by rotation of said cam about said axis of rotation is at least about five times as large as a diameter of a circle defined by rotation of a throat of said cam about said axis of rotation.

52. The brake of claim 51 wherein said cam includes
a first lobe; and,
a second lobe
wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement and a non-uniform surface opposite said working surface.

53. The brake of claim 51 wherein said cam includes
a first lobe; and,
a second lobe
wherein at least one lobe of said first and second lobes includes a first portion having a first profile and a second portion having a second profile different from said first profile, said first and second portions together defining a working surface configured for engagement with one cam follower of said first and second cam followers as said first and second brake shoes move from said position of disengagement to said position of engagement and a non-uniform surface opposite said working surface, said second portion defining a first radially inwardly extending rib defining a portion of said non-uniform surface.

54. The brake of claim 51 wherein said cam includes:
a first lobe; and,
a second lobe
wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from said throat of said cam to a tip of said one lobe, said second portion defining a rib extending across at least a portion of said pocket.

55. A brake, comprising:
a brake drum defining a braking surface;
first and second brake shoes, each of said first and second brake shoes including
    first and second webs, each of said first and second webs having first and second ends and said first and second webs pivotally mounted at said first ends;
    a brake table supported on said first and second webs; and,
    a brake lining disposed on said brake table;
a first cam follower located at said second ends of said first and second webs of said first brake shoe and having first and second working surfaces;
a second cam follower located at said second ends of said first and second webs of said second brake shoe and having first and second working surfaces; and,
a cam in engagement with said first and second working surfaces of said first and second cam followers, rotation of said cam in opposite rotational directions about an axis of rotation causing said first and second brake shoes to move between positions of engagement and disengagement with said braking surface
wherein said first and second webs of said first brake shoe are spaced from one another between said first and second ends of said first and second webs of said first brake shoe and angle towards one another proximate said first ends of said first and second webs of said first brake shoe, said first and second working surfaces of said first cam follower disposed outboard of said first and second webs of said first brake shoe.

56. The brake of claim 55 wherein said first and second webs of said second brake shoe are spaced from one another between said first and second ends of said first and second webs of said second brake shoe and angle towards one another proximate said first ends of said first and second webs of said second brake shoe, said first and second working surfaces of said second cam follower disposed outboard of said first and second webs of said second brake shoe.

57. The brake of claim 55 wherein said cam includes:
a first lobe; and,
a second lobe
wherein at least one lobe of said first and second lobes includes a first portion having a first profile and a second portion having a second profile different from said first profile, said first and second portions together defining a substantially uniform working surface configured for engagement with one cam follower of said first and second cam followers as said first and second brake shoes move from said position of disengagement to said position of engagement with said braking surface and a non-uniform surface opposite said working surface.

58. The brake of claim 55 wherein said cam includes:
a first lobe; and,
a second lobe
wherein at least one lobe of said first and second lobes includes a first portion having a first profile and a second portion having a second profile different from said first profile, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket.

59. The brake of claim 55 wherein said cam defines first and second slots intermediate axial ends of said cam, said first slot configured to receive said first ends of said first and second webs of said first brake shoe and said second slot configured to receive said first ends of said first and second webs of said second brake shoe when said first and second brakes are in said position of disengagement from said braking surface.

60. A cam for use in a brake having first and second brake shoes and first and second cam followers in engagement with said cam and with respective ones of said first and second brake shoes in which rotation of said cam in opposite rotational directions about an axis of rotation causes said first and second brake shoes to move between positions of engagement and disengagement with a braking surface, said cam comprising:
a first lobe; and,
a second lobe
wherein at least one lobe of said first and second lobes includes a first portion having a first profile and a second portion having a second profile different from said first profile, said first portion located at a first point along said axis and said second portion located at a second point along said axis different from said first point, said first and second portions together defining a substantially uniform working surface configured for engagement with one cam follower of said first and second cam followers as said first and second brake shoes move from said position of disengagement to said position of engagement and a non-uniform surface opposite said working surface.

61. The cam of claim 60 wherein said first and second profiles comprise profiles in axial cross-section.

62. The cam of claim 60 wherein said first portion extends from a throat of said cam to a tip of said at least one lobe and said second portion extends from said throat to said tip.

63. The cam of claim 60 wherein said second portion of said one lobe is disposed intermediate first and second axial ends of said one lobe.

64. The cam of claim 60 wherein said second portion of said one lobe is centered between first and second axial ends of said one lobe.

65. The cam of claim 60 wherein said second portion of said one lobe defines a radially inwardly extending rib.

66. The cam of claim 65 wherein a radial length of said rib is greatest proximate a tip of said one lobe.

67. The cam of claim 66 wherein said radial length of said rib decreases moving from said tip of said one lobe to a throat of said cam.

68. The cam of claim 60, wherein said one lobe includes a third portion located at a third point along said axis and having a third profile different from said first profile of said first portion of said one lobe.

69. The cam of claim 68 wherein said third portion defines a portion of said substantially uniform working surface of said one lobe.

70. The cam of claim 68 wherein said third profile is substantially similar to said second profile.

71. The cam of claim 68 wherein said second and third portions of said one lobe are disposed on opposite sides of said first portion of said one lobe.

72. The cam of claim 68 wherein said second and third portions of said one lobe are disposed at first and second axial ends of said one lobe.

73. The cam of claim 68 wherein said one lobe includes a fourth portion located at a fourth point along said axis and having a fourth profile different from said first profile of said first portion of said one lobe.

74. The cam of claim 73 wherein said second and third portions of said one lobe are disposed at first and second axial ends of said one lobe and said fourth portion of said one lobe is disposed intermediate said first and second axial ends of said one lobe.

75. The cam of claim 74 wherein said fourth portion of said one lobe is centered between said first and second axial ends of said one lobe.

76. The cam of claim 60 wherein said second portion of said one lobe is at least partially axially aligned with a portion of said one cam follower along an axis extending parallel to said axis of rotation when said first and second brake shoes are in a position of disengagement with said braking surface.

77. A brake, comprising:
a brake spider having a central aperture configured to receive an axle extending therethrough;
an anchor extending from said brake spider;
first and second brake shoes, each of said brake shoes including:
a first web pivotally mounted on said anchor at a first end;
a brake table supported on said first web; and,
a brake lining disposed on said brake table; and,
a first cam follower located at a second end of said first web of said first brake shoe;
a second cam follower located at a second end of said first web of said second brake shoe; and,
a cam in engagement with said first and second cam followers, rotation of said cam in opposite rotational directions about an axis of rotation causing said first and second brake shoes to move between positions of engagement and disengagement with a braking surface, said cam comprising:
a first lobe; and,
a second lobe
wherein at least one lobe of said first and second lobes includes a first portion having a first profile and a second portion having a second profile different from said first profile, said first portion located at a first point along said axis and said second portion located at a second point along said axis different from said first point, said first and second portions together defining a substantially uniform working surface configured for engagement with one cam follower of said first and second cam followers as said first and second brake shoes move from said position of disengagement to said position of engagement and a non-uniform surface opposite said working surface.

78. The brake of claim 77 wherein said one cam follower includes a first portion having a first profile and a second portion having a second profile different from said first profile of said first portion of said one cam follower.

79. The brake of claim 77 wherein said first and second profiles comprise profiles in axial cross-section.

80. The brake of claim 77 wherein said first portion extends from a throat of said cam to a tip of said at least one lobe and said second portion extends from said throat to said tip.

81. The brake of claim 77 wherein said second portion of said one lobe is disposed intermediate first and second axial ends of said one lobe.

82. The brake of claim 77 wherein said second portion of said one lobe is centered between first and second axial ends of said one lobe.

83. The brake of claim 77 wherein said second portion of said one lobe defines a radially inwardly extending rib.

84. The brake of claim 83 wherein a radial length of said rib is greatest proximate a tip of said one lobe.

85. The brake of claim 84 wherein said radial length of said rib decreases moving from said tip of said one lobe to a throat of said cam.

86. The brake of claim 77, wherein said one lobe includes a third portion located at a third point along said axis and having a third profile different from said first profile of said first portion of said one lobe.

87. The brake of claim 86 wherein said third portion defines a portion of said substantially uniform working surface of said one lobe.

88. The brake of claim 86 wherein said third profile is identical to said second profile.

89. The brake of claim 86 wherein said second and third portions of said one lobe are disposed on opposite sides of said first portion of said one lobe.

90. The brake of claim 86 wherein said second and third portions of said one lobe are disposed at first and second axial ends of said one lobe.

91. The brake of claim 86 wherein said one lobe includes a fourth portion located at a fourth point along said axis and having a fourth profile different from said first profile of said first portion of said one lobe.

92. The brake of claim 91 wherein said second and third portions of said one lobe are disposed at first and second axial ends of said one lobe and said fourth portion of said one lobe is disposed intermediate said first and second axial ends of said one lobe.

93. The brake of claim 92 wherein said fourth portion of said one lobe is centered between said first and second axial ends of said one lobe.

94. The brake of claim 77 wherein said second portion of said one lobe is at least partially axially aligned with a portion of said one cam follower along an axis extending parallel to said axis of rotation when said first and second brake shoes are in a position of disengagement with said braking surface.

95. A cam for use in a brake having first and second brake shoes and first and second cam followers in engagement with said cam and with respective ones of said first and second brake shoes in which rotation of said cam in opposite rotational directions about an axis of rotation causes said first and second brake shoes to move between positions of engagement and disengagement with a braking surface, said cam comprising:
a first lobe; and,
a second lobe wherein at least one lobe of said first and second lobes includes a first portion having a first profile and a second portion having a second profile different from said first profile, said first portion located at a first point along said axis and said second portion located at a second point along said axis different from said first point, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket, said first and second portions together defining a substantially uniform working surface configured for engagement with said one cam follower as said first and second brake shoes move from said position of disengagement to said position of engagement.

96. The cam of claim 95 wherein said first and second profiles comprise profiles in axial cross-section.

97. The cam of claim 95 wherein said first portion extends from a throat of said cam to a tip of said at least one lobe and said second portion extends from said throat to said tip.

98. The cam of claim 95, wherein said one lobe includes a third portion located at a third point along said axis and having a third profile different from said first profile of said first portion of said one lobe.

99. The cam of claim 98 wherein said third portion defines a portion of said substantially uniform working surface of said one lobe.

100. The cam of claim 98 wherein said third profile is identical to said second profile.

101. The cam of claim 98 wherein said second and third portions of said one lobe are disposed on opposite sides of said first portion of said one lobe.

102. The cam of claim 98 wherein said second and third portions of said one lobe are disposed at first and second axial ends of said one lobe.

103. The cam of claim 98 wherein said one lobe includes a fourth portion located at a fourth point along said axis and having a fourth profile different from said first profile of said first portion of said one lobe.

104. The cam of claim 103 wherein said second and third portions of said one lobe are disposed at first and second axial ends of said one lobe and said fourth portion of said one lobe is disposed intermediate said first and second axial ends of said one lobe.

105. The cam of claim 104 wherein said fourth portion of said one lobe is centered between said first and second axial ends of said one lobe.

106. The cam of claim 95 wherein said second portion of said one lobe is at least partially axially aligned with a portion of said one cam follower along an axis extending parallel to said axis of rotation when said first and second brake shoes are in said position of disengagement with said braking surface.

107. A brake, comprising:
a brake spider having a central aperture configured to receive an axle extending therethrough;
an anchor extending from said brake spider;
first and second brake shoes, each of said brake shoes including:
a first web pivotally mounted on said anchor at a first end;
a brake table supported on said first web; and,
a brake lining disposed on said brake table; and,
a first cam follower located at a second end of said first web of said first brake shoe;
a second cam follower located at a second end of said first web of said second brake shoe; and,
a cam in engagement with said first and second cam followers, rotation of said cam in opposite rotational directions about an axis of rotation causing said first and second brake shoes to move between positions of engagement and disengagement with a braking surface, said cam comprising:
a first lobe; and,
a second lobe
wherein at least one lobe of said first and second lobes includes a first portion having a first profile and a second portion having a second profile different from said first profile, said first portion located at a first point along said axis and said second portion located at a second point along said axis different from said first point, said first and second portions defining a pocket configured to receive one cam follower of said first and second cam followers when said first and second brake shoes are in a position of disengagement with said braking surface, said pocket extending from a throat of said cam to a tip of said one lobe, said second portion defining a rib extending across at least a portion of said pocket, said first and second portions together defining a substantially uniform working surface configured for engagement with said one cam follower as said first and second brake shoes move from said position of disengagement to said position of engagement.

108. The brake of claim 107 wherein said first and second profiles comprise profiles in axial cross-section.

109. The brake of claim 107 wherein said first portion extends from a throat of said cam to a tip of said at least one lobe and said second portion extends from said throat to said tip.

110. The brake of claim 107, wherein said one lobe includes a third portion located at a third point along said axis and having a third profile different from said first profile of said first portion of said one lobe.

111. The brake of claim 110 wherein said third portion defines a portion of said substantially uniform working surface of said one lobe.

112. The brake of claim 110 wherein said third profile is substantially similar to said second profile.

113. The brake of claim 110 wherein said second and third portions of said one lobe are disposed on opposite sides of said first portion of said one lobe.

114. The brake of claim 110 wherein said second and third portions of said one lobe are disposed at first and second axial ends of said one lobe.

115. The brake of claim 110 wherein said one lobe includes a fourth portion located at a fourth point along said axis and having a fourth profile different from said first profile of said first portion of said one lobe.

116. The brake of claim 115 wherein said second and third portions of said one lobe are disposed at first and second axial ends of said one lobe and said fourth portion of said one lobe is disposed intermediate said first and second axial ends of said one lobe.

117. The brake of claim 116 wherein said fourth portion of said one lobe is centered between said first and second axial ends of said one lobe.

118. The brake of claim 107 wherein said second portion of said one lobe is at least partially axially aligned with a portion of said one cam follower along an axis extending parallel to said axis of rotation when said first and second brake shoes are in said position of disengagement with said braking surface.

* * * * *